May 20, 1958         F. L. MOSELEY         2,835,856
SERVO SYSTEM INPUT AND BALANCING CIRCUIT
Filed May 3, 1956
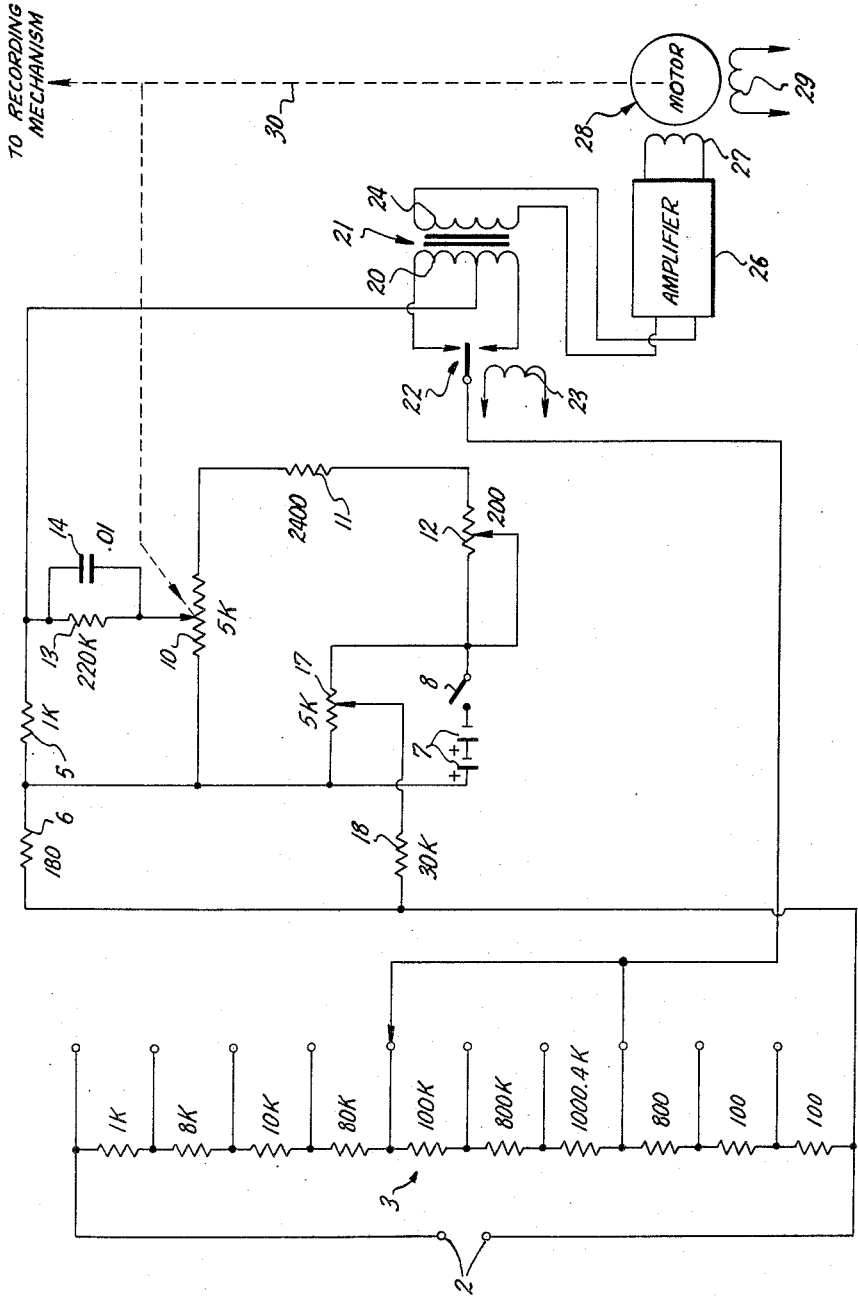
INVENTOR.
FRANCIS L. MOSELEY
BY
Robert H. Fraser
ATTORNEY

United States Patent Office 2,835,856
Patented May 20, 1958

2,835,856

SERVO SYSTEM INPUT AND BALANCING CIRCUIT

Francis L. Moseley, Pasadena, Calif., assignor to F. L. Moseley Co., a corporation of California Application May 3, 1956, Serial No. 582,434

6 Claims. (Cl. 318—28)

This invention relates to an improved input circuit for use in a servo system, and more particularly to an improved input circuit for use in a servo system including means for balancing an input signal against a reference voltage.

In servo systems operating on the null balance principle, it is well known to oppose an input signal to a voltage derived from a movable contactor of a potentiometer having a resistance element connected across a standardized source of voltage.

One difficulty encountered in servo systems including a potentiometer is the non-linearity of the relationship between the position of the contactor and the voltage appearing at the contactor which results from current being drawn from the contactor. This non-linearity is commonly referred to as "loading error."

Another difficulty present in servo systems including a potentiometer is the generation of spurious signals, i. e. noise, by the friction of the contactor in moving along the resistance element. The action by which the spurious signals are generated has been termed the "Triboelectric effect."

The operational difficulties encountered in servo systems using potentiometers have become increasingly more difficult to correct in servo systems where it is necessary to attenuate an input signal, insert an offset voltage, and at the same time maintain superior linearity and a low spurious signal level.

In accordance with the present invention an improved servo system input and balancing circuit is provided having characteristics which result in a superior operation of a servo system.

In an illustrative embodiment of the invention, a first resistor and a second resistor are connected serially between a pair of input terminals, a controllable portion of the voltage derived from a standardized source is applied to the first resistor as a balancing voltage, and a predetermined portion of the voltage derived from the standardized source is applied to the second resistor as an offset voltage. The balancing voltage may be derived from the source via a first potentiometer, the resistance element of which is connected serially with a linearity resistor across the source, and the offset voltage may be derived from a second potentiometer, the resistance element of which is connected across the source.

A better understanding of the invention may be had from a reading of the following detailed description and an inspection of the drawing in which the single figure is a combined block and schematic circuit diagram of an improved input and balancing circuit in a servo system.

In the servo system of the drawing, an input signal representing variations in a condition may be applied to a pair of input terminals 2. Since the input circuit floats free of ground reference potential, no polarity designations are given for the terminals 2. Across the input terminals 2 may be connected an attenuator 3. The attenuator 3 may be designed to reduce the input signal by a predetermined amount in accordance with the position of the attenuator contactor so that the servo system may be used for widely variant input signal magnitudes. The attenuator 3 comprises a voltage divider having a movable contactor which is connected to short out or by pass selected portions of the resistance. Thus, for minimum attenuation when the contactor is at the top end of the voltage divider the signal applied to the terminals 2 is fed to the input circuit across only a small portion of the voltage divider. By moving the contactor towards the bottom end of the voltage divider the fractional part of the signal passed by the attenuator is decreased.

Connected serially between the lower of the pair of terminals 2 and the attenuator contactor are a first resistor 5, and a second resistor 6. In operation, voltages are impressed on the first and second resistors 5 and 6 which oppose and balance the input signal. In the case of the first resistor 5, the voltage is adjusted in accordance with variations in the input signal, and may be termed a balancing voltage.

In the case of the second resistor 6, the voltage is set at a predetermined value which will bring the variations in the input signal within the range of response of the servo system. For example, where the servo system is used in a graphical recorder to provide a visible record of the variations of an input signal, the origin of the curve may be positioned so that the unilateral component of the input signal is eliminated from the record with only the variable component being recorded. Since the voltage applied across the second resistor 6 effectively functions as a zero offset, the voltage may be termed an offset voltage.

Both the balancing voltage and the offset voltage may be obtained from a source of voltage such as a pair of standard cells 7 connected in series. When the servo system is not in operation the standard cells 7 may be disconnected by means of a switch 8.

The balancing voltage is derived from the cells 7 by means of a potentiometer 10 having a movable contactor and a resistance element which is connected serially with a lineratity resistor 11 and an adjustable compensating resistor 12. By adjustment of the resistor 12 from time to time, compensation may be made for variations in the voltage supplied by the standard cells 7.

The linearity resistor 11 functions in cooperation with the potentiometer 10 to provide a substantially linear relationship between the position of the movable contactor of the potentiometer 10 and the voltage appearing across the first resistor 5 and a voltage-dropping resistor 13. By a suitable selection of the circuit values of the potentiometer 10 and the linearity resistor 11, the so-called "loading error" may be substantially eliminated.

The voltage-dropping resistor 13 works in conjunction with the first resistor 5 as a voltage divider whereby a predetermined fractional part of the voltage passed by the potentiometer 10 is impressed on the first resistor 5 in opposition to the input signal. By this means, any spurious signals generated by the action of the contactor in engaging the resistance element of the potentiometer are also reduced so that a favorable signal to noise ratio is obtained across the first resistor 5.

The offset voltage applied across the second resistor 6 may be obtained from the standard cells 7 via a potentiometer 17. Since the linearity requirement for the offset voltage is generally not as strict as in the case of the balancing voltage, no linearity resistor is included in series with the resistance element of the potentiometer 17 although if required, a linearity resistor may be included in a manner similar to that described above in connection with the potentiometer 10.

Connected to the contactor of the potentiometer 17 is a voltage-dropping resistor 18 which cooperates with the second resistor 6 to form a voltage divider whereby a predetermined fractional part of the voltage passed by the potentiometer 17 appears across the second resistor 6.

In a condition of balance, the offset voltage and the balancing voltage substantially counterbalance the portion of the input signal passed by the attenuator 3 so that substantially no unbalance voltage appears between the center tap of a primary winding 20 of a transformer 21 and a movable contact of a set of single-pole double-throw contacts 22. Thus, considering the circuit loop from one of the terminals 2 through the attenuator 3, the contacts 22, the center tap of the primary winding 20, the resistors 5 and 6 and back to the other of the terminals 2, in a state of balance the voltage appearing across the resistors 5 and 6 is substantially equal and opposite to the input signal applied to the terminals 2.

However, upon a variation in the input signal, an unbalance voltage appears between the center tap of a primary winding 20 of a transformer 21 and the movable contact of a set of single-pole double-throw contacts 22. The contacts 22 may be included in a conventional vibrator in which they are actuated by an energizing coil 23 which may be connected to a suitable source of alternating current (not shown).

The contacts 22 function to apply the unbalance voltage alternately to opposite ends of the primary winding 20, thereby causing an alternating current wave to appear across a secondary winding 24 of the transformer 21. The alternating current wave appearing across the secondary winding 24 is of reversible phase and variable amplitude in accordance with the polarity and magnitude of the unbalance voltage, and after being amplified by an amplifier 26, is applied to one winding 27 of a reversible motor 28. By energizing another winding 29 of the motor 28 from an alternating current source such as the source (not shown) from which the coil 23 of the vibrator is energized, the motor 28 is caused to rotate in a direction and to an extent corresponding to the phase and amplitude of the wave appearing across the secondary winding 24.

The motor 28 may be linked to a recording mechanism or other mechanism to be driven by the servo system via a mechanical linkage indicated by a dashed line 30.

In addition, the motor 28 is linked to the contactor of the potentiometer 10 so that as the motor 28 is caused to rotate by the wave appearing across the secondary winding 24, the balancing voltage appearing across the first resistor 5 is adjusted to reduce the unbalance signal until a state of balance is achieved in the system and the motor 28 comes to rest.

From the foregoing, it will be apparent to those skilled in the art that this invention provides an improved and very satisfactory system capable of achieving the objects and advantages herein set forth. It will be apparent, however, that variation may be made in the exemplary circuit without departing from the novel features of the invention. Consequently, the invention should be afforded the full scope of the appended claims.

What is claimed is:

1. In a servo system an improved input and balancing circuit including in combination a pair of input terminals to which may be applied a unidirectional electrical signal representing variations in a condition, a first resistor across which a balancing voltage may be impressed, a second resistor across which an offset voltage may be impressed, means connecting said first resistor and said second resistor serially between said input terminals, a constant source of unidirectional voltage, a first potentiometer including a resistance element and a contactor, a linearity resistor, means connecting said first potentiometer resistance element and said linearity resistor serially across said source of voltage, means applying the voltage appearing between the contactor and one end of the resistance element of said first potentiometer across said first resistor as a balancing voltage, a second potentiometer having a resistance element and a contactor, means connecting said second potentiometer resistance element across said source of voltage, and means applying the voltage appearing between said second potentiometer contactor and one end of said second potentiometer resistance element across said second resistor as an offset voltage.

2. In a servo system an improved input and balancing circuit including in combination a pair of input terminals to which may be applied a unidirectional signal, a first resistor, a second resistor, means connecting said first and second resistors serially across said input terminals, a constant source of unidirectional voltage, a first potentiometer including a resistance element and a contactor, a linearity resistor adapted to cooperate with said first potentiometer, means connecting said linearity resistor and said first potentiometer resistance element serially across said source of voltage, a third resistor connected serially between the first potentiometer contactor and one end of said first resistor to apply a balancing voltage across said first resistor as a function of the position of the contactor of said first potentiometer, a second potentiometer including a resistance element and a contactor, means connecting the resistance element of said second potentiometer across said source of voltage, and a fourth resistor connected serially between the second potentiometer contactor and one end of said second resistor to apply an offset voltage across said second resistor.

3. In a servo system an improved input and balancing circuit including in combination a pair of input terminals to which may be applied a unidirectional signal, a first resistor, a second resistor, a common connection between said first and said second resistors, means connecting said first and second resistors serially across said input terminals, a constant source of unidirectional voltage, a first potentiometer including a resistance element and a contactor, a linearity resistor adapted to cooperate with said first potentiometer, means connecting said linearity resistor and said first potentiometer resistance element to said common connection, means applying the voltage appearing between the contactor and the one end of said first potentiometer resistance element across said first resistor as a balancing voltage, a second potentiometer including a resistance element and a contactor, means connecting said second potentiometer resistance element serially across said source of voltage, and means applying the voltage appearing between said second potentiometer contactor and one end of said second potentiometer resistance element across said second resistor as an offset voltage.

4. An input and balancing circuit for use in a servo system, including in combination a pair of input terminals to which may be applied a unidirectional input signal, a first resistor, a second resistor, means connecting said first and second resistors serially between said input terminals, a constant source of unidirectional voltage, means applying a variable portion of the unidirectional voltage from said source across said first resistor as a balancing voltage, and means applying a variable portion of the unidirectional voltage from said source across said second resistor as an offset voltage.

5. An input and balancing circuit for use in a servo system, including in combination a pair of terminals to which may be applied an input signal, a first impedance, a second impedance, means connecting said first and second impedances serially between said terminals, a standard source of voltage, means applying a variable portion of the voltage from said source across said first impedance as a balancing voltage, and means applying a variable portion of the voltage from said source across said second impedance as an offset voltage.

6. In a servo system, the combination of a pair of input terminals, a first resistor, a second resistor, said first and second resistors being connected serially between said input terminals, a constant source of unidirectional voltage, a first potentiometer including a resistance element and a contactor, a linearity resistor adapted to cooperate with said first potentiometer, means connecting said linearity resistor and said first potentiometer resistance element serially across said source of voltage, means applying a portion of the voltage appearing between the contactor and one end of the resistance element of said first potentiometer across said first resistor as a balancing voltage, a second potentiometer having a resistance element and a contactor, means connecting said second potentiometer resistance element across said source of voltage, means applying the voltage appearing between said second potentiometer contactor and one end of said second potentiometer resistance element across said second resistor as an offset voltage, and means positioning said first potentiometer contactor as a function of the voltages appearing across said first and second resistors.

References Cited in the file of this patent

UNITED STATES PATENTS

| | | |
|---|---|---|
| 2,489,999 | Cherry | Nov. 29, 1949 |
| 2,503,085 | Williams | Apr. 4, 1950 |
| 2,506,006 | Wild | May 2, 1950 |
| 2,506,531 | Wild | May 2, 1950 |
| 2,593,950 | Williams | Apr. 22, 1952 |